US010745596B2

United States Patent
Canale

(10) Patent No.: US 10,745,596 B2
(45) Date of Patent: Aug. 18, 2020

(54) FLAME RETARDANT PRESSURE-SENSITIVE TAPE

(71) Applicant: Madico, Inc., Woburn, MA (US)

(72) Inventor: Philip Louis Canale, Chelmsford, MA (US)

(73) Assignee: MADICO, INC., Pinellas Park, FL (US)

( * ) Notice: Subject to any disclaimer, the term of this patent is extended or adjusted under 35 U.S.C. 154(b) by 144 days.

(21) Appl. No.: 15/700,865

(22) Filed: Sep. 11, 2017

(65) Prior Publication Data

US 2018/0072922 A1   Mar. 15, 2018

Related U.S. Application Data

(60) Provisional application No. 62/393,269, filed on Sep. 12, 2016.

(51) Int. Cl.
*C09J 7/00* (2018.01)
*C09J 133/06* (2006.01)
(Continued)

(52) U.S. Cl.
CPC ......... *C09J 133/064* (2013.01); *C08L 101/00* (2013.01); *C09J 7/385* (2018.01); *C09J 133/02* (2013.01); *C09J 133/066* (2013.01); *C08K 5/0066* (2013.01); *C08K 5/0091* (2013.01); *C08K 5/23* (2013.01); *C08K 5/31* (2013.01); *C08K 5/315* (2013.01); *C08K 5/5313* (2013.01); *C09J 2201/122* (2013.01); *C09J 2201/128* (2013.01); *C09J 2201/606* (2013.01); *C09J 2201/622* (2013.01); *C09J 2205/102* (2013.01);
(Continued)

(58) Field of Classification Search
None
See application file for complete search history.

(56) References Cited

U.S. PATENT DOCUMENTS

| 3,190,788 A | 6/1965 | Loos | |
| 4,137,362 A * | 1/1979 | Miki | C09J 7/243 428/337 |

(Continued)

FOREIGN PATENT DOCUMENTS

| WO | 2012076905 A1 | 6/2012 |
| WO | 2014070969 A1 | 5/2014 |

OTHER PUBLICATIONS

Wikipedia, The Free Encyclopedia, Aluminium diethyl phonspinate, Aug. 10, 2016, https://en wikipediacrg/wiki/Ahrninkrn cielhyl_phosphinate, 3 pages.

(Continued)

*Primary Examiner* — Alexandre F Ferre
(74) *Attorney, Agent, or Firm* — Michael E. Dockins; Shumaker, Loop Kendrick, LLP

(57) ABSTRACT

Pressure-sensitive adhesive formulations based on acrylic or rubber adhesives are provided in combination with an aluminum phosphorous salt intumescent flame retardant and a nitrogen containing flame retardant which can act as a blowing agent through thermal decomposition. These flame retardant additives can be incorporated into the adhesive in levels of 10 to 30 percent by weight. These formulations are then placed on a polymeric flame retardant substrate in either a single-sided or double-sided form.

20 Claims, 1 Drawing Sheet

(51) Int. Cl.
*C09J 7/38* (2018.01)
*C09J 133/02* (2006.01)
*C08L 101/00* (2006.01)
*C08K 5/00* (2006.01)
*C08K 5/31* (2006.01)
*C08K 5/23* (2006.01)
*C08K 5/315* (2006.01)
*C08K 5/5313* (2006.01)

(52) U.S. Cl.
CPC ...... *C09J 2433/00* (2013.01); *C09J 2467/006* (2013.01); *C09J 2469/006* (2013.01); *C09J 2471/006* (2013.01); *C09J 2479/086* (2013.01); *C09J 2481/006* (2013.01)

(56) References Cited

U.S. PATENT DOCUMENTS

| | | | | |
|---|---|---|---|---|
| 5,296,074 A | * | 3/1994 | Graham | ............ H01L 23/49513 156/309.9 |
| 5,613,942 A | * | 3/1997 | Lucast | ................... A61L 15/58 602/52 |
| 6,001,440 A | | 12/1999 | Miyamoto et al. | |
| 7,393,901 B1 | * | 7/2008 | Filiatrault | ............. C09J 133/06 524/493 |
| 8,795,557 B2 | | 8/2014 | Elkovitch | |
| 2006/0199897 A1 | * | 9/2006 | Karjala | ................... A61L 15/58 524/543 |
| 2008/0241529 A1 | * | 10/2008 | Bauer | ........................ C09J 9/00 428/355 R |
| 2009/0242844 A1 | | 10/2009 | Elkovitch | |
| 2015/0275050 A1 | | 10/2015 | Wei-Cheng et al. | |

OTHER PUBLICATIONS

Primer: Hyhygroscopic VS Non-Hygroscopic Resins, Apr. 25, 2016 (Apr. 25, 2016); entire document.
Plastics Testing, Sep. 12, 2015 (Sep. 12, 2015); entire document.
Aircraft Materials Fire Test Handbook, Apr. 2000 (Apr. 2000), Final Report; entire document.
IEC 61965, Jul. 2003 (Jul. 2003), Second edition; entire document.
The Adhesive Tape Engineers Feb. 18, 2013 (Feb. 18, 2013); entire document.

* cited by examiner

FLAME RETARDANT PRESSURE-SENSITIVE TAPE

CROSS-REFERENCE TO RELATED APPLICATIONS

This application claims the benefit of U.S. Provisional Application No. 62/393,269, filed on Sep. 12, 2016. The entire disclosure of the above application is incorporated herein by reference.

FIELD

The embodiments of the present invention relate generally to a pressure-sensitive adhesive and backing or support film. More particularly, the embodiments of the present invention relate to a pressure-sensitive adhesive that will be flame retardant per UL-94 VTM-0 or V-0 and the FAA testing for the 60 second vertical burn test.

Introduction

This section provides background information related to the present disclosure which is not necessarily prior art.

Due to their ease of use, pressure-sensitive adhesives are being utilized in increasingly demanding applications, in industries including electronics and aerospace. Such applications can require the pressure-sensitive adhesive to be flame-retardant and additionally require meeting the limitations of tests such as the Underwriters Laboratories (UL) UL 94 V-0 or VTM-0 tests and the U.S. Department of Transportation Federal Aviation Administration (FAA) vertical 60 second burn test.

Halogenated materials can be used to produce flame-retardance to pass UL and FAA tests. However, halogenated materials can cause disposal hazards and, further, can be harmful in a fire as they can emit gaseous toxic halogen acids and/or high volumes of thick smoke when decomposed. Thick smoke and gas can reduce visibility, causing difficulty in applications including the electronics and aerospace industry. European regulations, such as the Registration, Evaluation, Authorization and Restriction of Chemicals (REACH) regulation, can limit use of halogenated materials in appreciable amounts.

SUMMARY

It would be advantageous in view of the above discussion to provide systems and methods for an improved formulation including a non-halogenated material with strong adhesive properties in order to meet the stringent testing protocols required for FAA regulations, REACH, as well as Underwriters Laboratories UL 94 V-0 or VTM-0 tests.

The present technology achieves these goals by providing aluminum and special nitrogen intumescent flame retardant combinations to produce a flame retardant pressure-sensitive adhesive (PSA) at low levels of the flame retardant materials. Instead of using a water and exchange sensitive salt, such as ammonium polyphosphate, polyallylammonium pyrophosphate, or polyphosphonamide, embodiments of the present technology can use aluminum diethyl phosphinate (commercially available as Exolit® OP930, Exolit® OP935, Exolit® OP945, and Exolit® OP1230) in combination with dicyanoguanidine, a phthalocyanine pigment, nano zinc oxide, and/or carbon nanotubes to produce materials that will pass UL V-0 VTM-0 tests and FAA 60 second burn tests.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
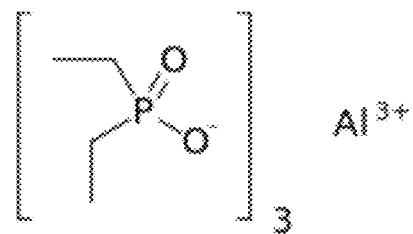
FIG. 1 illustrates an aluminum diethyl phosphinate portion of the flame retardant portion of an embodiment of a pressure sensitive adhesive of the present disclosure.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including testing protocols, patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

The present technology is drawn to a pressure-sensitive adhesive that includes an acrylic adhesive or a rubber adhesive, aluminum diethyl phosphinate, and a gas release agent, where the pressure-sensitive adhesive is non-hygroscopic. The acrylic adhesive can include a resin-based adhesive that is comprised of acrylic and/or methylacrylic polymers and can include various acrylic materials, such as solutions of copolymers of alkyl acrylates as well as acrylic acid, acrylonitrile, and/or acrylamide. Various acrylic adhesives are known in the art. Acrylic adhesives can be formed into a polymer, suspended in a catalyst, and cured. The rubber adhesive can include natural or synthetic elastomers that are tackified by the addition of various resins, including natural latex and rubber butyl based hot melts or styrene-butadiene compounds. Various rubber adhesives are known in the art. The aluminum diethyl phosphinate is included at between about 14 wt % and about 29 wt %. The gas release agent is included at between about 1 wt % and about 10 wt %. The gas release agent includes one or more of dicyanoguanidine, phthalocyanine pigment, diazo compound, and melamine cyanurate.

Pressure-sensitive adhesives according to the present technology can be applied to a substrate such as a film, tape, or the like. The pressure-sensitive adhesive In some embodiments, the substrate can be a flame-retardant material such as a polyimide, commercially available as KAPTON® film from DuPont. In other embodiments, the substrate can be a flame retardant grade of polyethylene terephthalate or polycarbonate film such as, for example, commercially available TETORON® OF film or LEXAN® 9034V, LEXAN® EFR85-701, LEXAN® EFR63-NC, or LEXAN® EFR65- 701, respectively. The flame retardant substrate can be preferably polyphenylene oxide, Solvay's Radel® R-7000 PPSU, polybenzaimidazole or any polymer which is intrinsically flame retardant or flame retardant through incorporation of additives. The adhesive can be coated on one side of the substrate to form a one sided pressure-sensitive adhesive substrate or can be applied to both sides and act as two-sided tape. These constructions can be much more hydrolytically and thermally stable offering improved adhesive properties due to lower loading levels of solid materials. In addition materials can be incorporated into the adhesive by simple dispersion mixing methods such as a high speed disperser blade due to their supplied small particle size and superior dispensability. The formulations described here can avoid the use of more expensive processing means such as 3 roll mills, ball mills, or sand mills to reduce particle sizes capable of being coated at or below 25 microns as a pressure-sensitive adhesive.

In an embodiment, the present disclosure provides a pressure sensitive adhesive comprising an acrylic adhesive or a rubber adhesive. In an embodiment, a pressure-sensitive adhesive contains 15 to 29 percent by weight, or wt %, of a combination of aluminum diethyl phosphinate, preferably at a level between 18 and 24 percent by weight, and a material capable of decomposing and acting as a blowing or gas releasing agent such as dicyanoguanidine, a phthalocyanine pigment, or diazo compound at a level between 1 and 10 percent by weight, preferably at a level between 3 and 7 percent by weight. In other cases, these materials can be present at quantities of less than 20%, less than 10%, less than 7% or less than 5%, by weight. Commercially available examples of suitable aluminum diethyl phosphinate include, but are not limited to, Exolit® OP930, Exolit® OP935, Exolit® OP945, and Exolit® OP1230. Aluminum diethyl phosphinate is one example of a non-halogenated material. A material can be defined as non-halogenated if it contains less than 0.1% halogens, trace amounts due to residuals from material synthesis, less than 1000 PPM or less than 100 PPM.

In an embodiment, the pressure-sensitive adhesive is non-hygroscopic. A pressure-sensitive adhesive is non-hygroscopic if it does not absorb moisture from air at greater than 1000 parts per million (PPM, µg/g) at standard temperature and pressure. Typically, pressure sensitive adhesives can be unstable in the presence of water, including water levels in the air. Therefore, the non-hygroscopic aspect can be important for stability of the pressure-sensitive adhesive of the present disclosure.

In an embodiment, the pressure-sensitive adhesive is substantially insoluble in water and organic solvents. Substantially insoluble in water means that the material is soluble in DI water at less than 0.1 g per 100 mL of solvent at 25° C. and neutral pH. The total amount of flame retardant components as well as the amounts of each of the flame retardant materials that make up the total amount of flame retardant component can be varied over a wide range but are present in an amount sufficient to render the adhesive flame retardant per the standards described, UL94 VTM-0, V-0 and FAA 60 second vertical burn test.

The aluminum diethyl phosphinate portion of the flame retardant component is represented in FIG. 1.

In an embodiment, the material combinations in the pressure-sensitive adhesive comprise a ratio of aluminum phosphinate to gas release agent of between 2.9:1 and 15:1, preferably at a ratio of 6:1. These ratios are capable of producing flame retardance meeting UL94 VTM-0 or V-0 as well as the more stringent FAA 60 second vertical burn test and tests for heat and smoke release. In addition, the level of flame retardance in these materials can be at such low concentrations that even though the flame retardants detract from pressure-sensitive adhesive tackiness, the pressure-sensitive adhesives have a level of tack and peel strength capable of passing impact testing such as the ball impact test contained in IEC 61965.

In an embodiment of the present disclosure, a pressure sensitive adhesive can be coated on a naturally flame retardant substrate such as a polyimide, polyphenylene sulfide, polyphenylene oxide, polyphenylsulfone, polybenzimidazole or a substrate chemically modified with flame retardant additives such as polyethylene terephthalate films or polycarbonate films. In an embodiment, the thickness of the substrate can be in the range of 0.025 mm to 0.254 mm Polyphenylsulfone can be commercially available as Solvay's Radel® R-7000 PPSU. Polyimide can be commercially available as Kapton. Polyethylene terephthalate films can be commercially available as Dupont Tetoron OF film. Polycarbonate films can be commercially available as Sabic's EFR63-NC or EFR65.

In an embodiment of the present disclosure, the pressure sensitive adhesive can comprise 0.02 to 2 percent of nanoparticles such as nano zinc oxide, aluminum oxide, silicon dioxide, and/or carbon nanotubes, wherein the nanoparticles support flame retardance. The nanoparticles support the flame retardance enough such that lower levels of flame retardant such as aluminum diethyl phosphinate can be used. For example, between 10 and 20 percent of aluminum diethyl phosphinate in the pressure-sensitive adhesive can be used in combination with nanoparticles, preferably between 12 and 18 percent of aluminum diethyl phosphinate, most preferably between 13 and 16 percent aluminum diethyl phosphinate. In these and other embodiments that pass the Underwriters Laboratories (UL) UL 94 V-0 or VTM-0 tests and/or the U.S. Department of Transportation Federal Aviation Administration (FAA) vertical 60 second burn test, the concentration of aluminum diethyl phosphinate in the pressure-sensitive adhesive can be less than or equal to 30%, less than or equal to 25%, less than or equal to 22%, less than or equal to 20%, less than or equal to 15%, less than or equal to 14% or less than or equal to 13% by weight.

Figure 2:
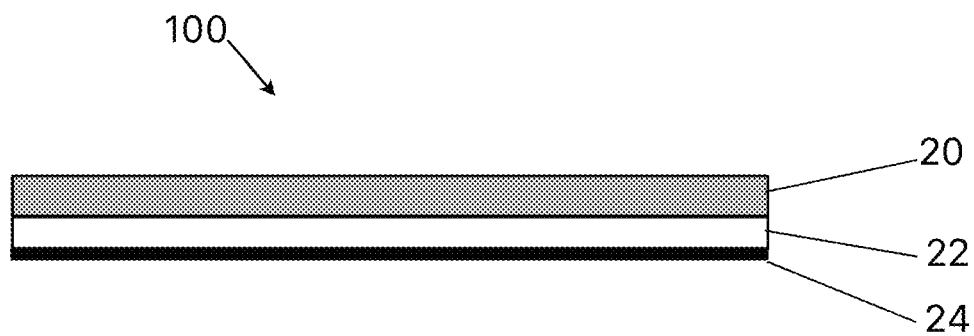
FIG. 2 illustrates a first embodiment of a layered structure including a pressure sensitive adhesive according to the present disclosure.
Figure 3:
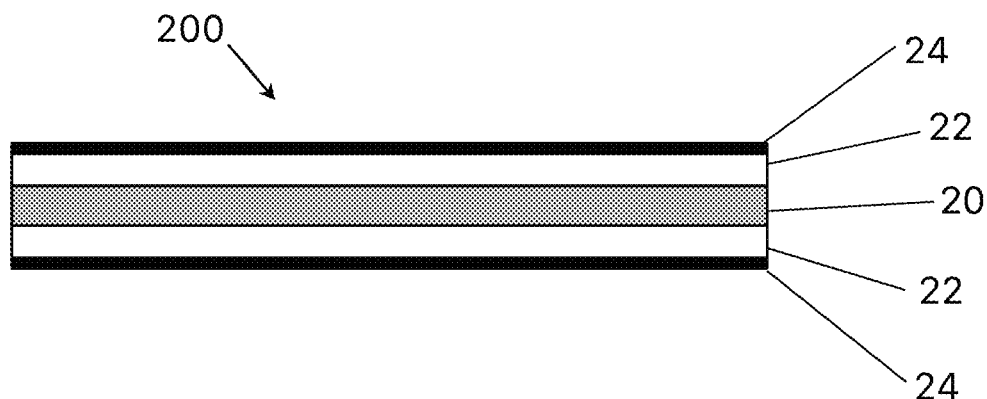
FIG. 3 illustrates a second embodiment of a layered structure including a pressure sensitive adhesive according to the present disclosure.

In embodiments of the present disclosure, a pressure sensitive adhesive can be coated on one or both sides of a substrate. FIG. 2 illustrates a single-sided pressure-sensitive tape 100, in which a substrate 20 is shown coated with a layer of a flame retardant pressure-sensitive adhesive 22 on one side thereof. FIG. 3 illustrates a double-sided pressure-sensitive tape 200, in which the substrate 20 is coated with a layer of flame retardant pressure-sensitive adhesive 22 on each side thereof. The thickness of pressure sensitive adhesive 22 can be in the range of 0.011 mm to 0.254 mm. A backing 24 can be added to the various pressure-sensitive adhesive 22 layers to protect the pressure-sensitive adhesive 22, where the backing 24 layer or layers can be removed prior to use of the single-sided pressure-sensitive tape 100 or the double-sided pressure-sensitive tape 200.

It is contemplated that the pressure-sensitive adhesive here disclosed can be used in aircraft applications, in-the-cabin applications, as a surface layer on mirrors, as a surface layer on glass, for example, or a combination thereof.

EXAMPLES

The following examples are offered to aid in the understanding of the present invention and are not to be construed as limiting the scope thereof. The following test methods and protocols were employed in the evaluation of the illustrative and comparative examples that follow:

Test Methodologies

Underwriters Laboratories UL94 VTM-0 Test

UL 94, the Standard for Safety of Flammability of Plastic Materials for Parts in Devices and Appliances testing is a plastics flammability standard released by Underwriters Laboratories of the United States. The standard classifies plastics according to how they burn in various orientations and thicknesses. Tests are generally conducted on a 12.7 cm×1.27 cm specimen of the minimum approved thickness.

The VTM-0 classification is assigned to very thin films that are generally not capable of supporting themselves in a horizontal position.

Testing was performed on a construction using a thickness of 0.0254 mm of adhesive of the formula indicated on both sides of a thickness of either 0.0381 mm or 0.127 mm UF polyester film with one side laminated to a mirrored glass of thickness 0.6 mm.

Underwriters Laboratories UL94 V-0 Test

This standard test requires that the material is tested in a vertical position and self-extinguishes within 10 seconds after the ignition source is removed; drips of particles are allowed as long as they are not inflamed.

Testing was performed on a construction using a thickness of 0.0254 mm of adhesive of the formula indicated on both sides of a thickness of either 0.0381 mm or 0.127 mm UF polyester film with one side laminated to a mirrored glass of thickness 0.6 mm.

FAA 60 Second Vertical Burn Test

A specimen is exposed to open flame for an ignition time period of 60 seconds. The flame time, or time the specimen continues to flame after the burner flame is removed from beneath the specimen, is recorded. Surface burning that results in a glow but not a flame is not included. Drip flame time is the time in seconds that any flaming material continues to flame after falling from the specimen to the floor of the chamber. If no material falls from the specimen, the drip flame time is reported to be 0 seconds. If there is more than one drop, the drip flame time reported is that of the longest flaming drip. If succeeding flaming drips reignite earlier drips that flamed, the drip flame time reported is the total of all flaming drips. Average length of the burn is the average distance from the original specimen edge to the farthest evidence of damage to the test specimen due to that area's combustion including areas of partial consumption, charring, or embrittlement but not including areas sooted, stained, warped, or discolored not areas where material has shrunk or melted away from the heat.

To pass the test, average flame time will not exceed 15 seconds. Average drip extinguishing time for all of the specimens tested will not exceed 3 seconds. Average burn length for specimens tested will not exceed 152 mm.

The preferred placement of the burner flame is under the middle of the lower edge of the face of the specimen.

Testing was performed on a construction using a thickness of 0.0254 mm of adhesive of the formula indicated on both sides of a thickness of either 0.0381 mm or 0.127 mm UF polyester film with one side laminated to a mirrored glass of thickness 0.6 mm.

Ball Impact Test

The requirements for the ball impact test are described in IEC 61965.

A solid smooth steel ball of (40+1) mm diameter and mass of (260±15) g, including the hook, and a minimum C scale Rockwell hardness of 60, shall be suspended by suitable means such as a fine wire or chain with a mass not exceeding 10% of the mass of the ball and the hook. It shall be allowed to fall freely as a pendulum from a calculated height and strike the face of the sample with an energy of (5.5±0.1) J. The sample is placed so that the face is vertical and in the same vertical plane as the point of support of the pendulum. The test material passes the test if there are no pieces of glass having a mass greater than 15 grams between 0.6 and 1.2 meters away and the total mass of all pieces of glass 0.6 to 1.2 meters away does not exceed 45 grams. Additionally, there shall be no single piece of glass having a mass greater than 1.5 grams beyond the 1.2 meter barrier.

Tack and Peel Strength Test

Testing was performed on a construction using a thickness of 0.0254 mm of adhesive of the formula indicated on both sides of a thickness of either 0.0381 mm or 0.127 mm UF polyester film with one side laminated to a mirrored glass of thickness 0.6 mm.

The tests were performed in accordance with ISO 8510-1. The film strip is pulled from the surface at an angle of 90° at a rate of (50±5) mm/min. The average peel force for at least 100 mm detachment is recorded and the average peel force per cm of width is calculated.

Constructions and Formulae

Constructions and formulae capable of meeting UL94 VTM-0 or V-0 as well as the more stringent FAA 60 second vertical burn test and tests for heat and smoke release are described in Table 1. The level of flame retardance in these materials are at such a low level that they have a level of tack and peel strength capable of passing impact testing such as, for example, the ball impact test.

TABLE 1

| | Percent | Percent | Percent |
|---|---|---|---|
| Materials | | | |
| Hydroxy functional acrylate | 72 | — | — |
| Carboxylic Acid functional acrylate | — | 74 | 74 |
| Aluminum Diethyl Phosphinate | 20 | 22 | 22 |
| Phthalocyanine Blue Pigment | — | — | 4 |
| Dicyanoguanidine | 3.5 | 3.5 | — |
| Isocyanate crosslinking agent | 4.5 | — | — |
| Aluminum acetyl acetonate crosslinking agent | — | 0.5 | 0.5 |
| Testing | | | |
| Peel Strength, PLI | 3.3 | — | — |
| Ball Impact | Pass | — | — |
| 60 second burn test* | | | |
| Average time of burn, seconds | 0 | 0 | 0 |
| Average drip flame time, seconds | 0 | 1 | 0 |
| Average length of burn, inches | 5.5 | 4.75 | 5.5 |

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A pressure-sensitive adhesive, comprising:
   an acrylic adhesive or a rubber adhesive;
   aluminum diethyl phosphinate from about 14 wt % to about 29 wt %; and
   a gas release agent from about 1 wt % to about 10 wt %, the gas release agent including a member selected from the group consisting of: dicyanoguanidine, phthalocyanine pigment, diazo compound, melamine cyanurate, and combinations thereof;
   wherein the pressure-sensitive adhesive is non-hygroscopic and does not absorb moisture from air at greater than 1000 parts per million.

2. The pressure-sensitive adhesive of claim 1, wherein the aluminum diethyl phosphinate is from about 15 wt % to about 21 wt %.

3. The pressure-sensitive adhesive of claim 1, wherein the gas release agent is from about 2 wt % to about 5 wt % and the pressure-sensitive adhesive flame provides flame retardance to meet UL94 VTM-0, V-0, and the FAA 60 second vertical burn test and tests for heat and smoke release.

4. The pressure-sensitive adhesive of claim 1, wherein the ratio of aluminum diethyl phosphinate to gas release agent is from about 2.9:1 to about 15:1.

5. The pressure-sensitive adhesive of claim 1, wherein the ratio of aluminum diethyl phosphinate to gas release agent is about 6:1.

6. The pressure-sensitive adhesive of claim 1, wherein the pressure-sensitive adhesive is coated on a substrate.

7. The pressure-sensitive adhesive of claim 6, wherein the substrate includes a member selected from the group consisting of: polyimide, polyphenylene sulfide, polyphenylene oxide, polyphenylsulfone, polybenzimidazole, and combinations thereof.

8. The pressure-sensitive adhesive of claim 6, further comprising a backing covering the pressure-sensitive adhesive, the pressure-sensitive adhesive disposed between the backing and the substrate.

9. The pressure-sensitive adhesive of claim 6, wherein the substrate includes a flame retardant additive, the flame retardant additive including a member selected from the group consisting of: polyethylene terephthalate, polycarbonate, and combinations thereof.

10. The pressure-sensitive adhesive of claim 6, wherein the substrate has a thickness from about 0.011 mm to about 0.254 mm.

11. The pressure-sensitive adhesive of claim 1, further comprising from greater than 0 wt % to about 2 wt % of particles, the particles including a member selected from the group consisting of: nano zinc oxide, aluminum oxide, silicon dioxide, carbon nanotubes, and combinations thereof.

12. The pressure-sensitive adhesive of claim 1, wherein the pressure-sensitive adhesive is coated on one side of a flame retardant substrate.

13. The pressure-sensitive adhesive of claim 12, wherein a thickness of the pressure-sensitive adhesive is from about 0.011 mm to about 0.254 mm.

14. The pressure-sensitive adhesive of claim 1, wherein the pressure-sensitive adhesive is coated on both sides of a flame retardant substrate.

15. The pressure-sensitive adhesive of claim 1, wherein the pressure-sensitive adhesive is substantially insoluble in water.

16. The pressure-sensitive adhesive of claim 1, wherein the pressure-sensitive adhesive passes ball impact testing according to IEC 61965.

17. A pressure-sensitive adhesive, comprising:
an acrylic adhesive or a rubber adhesive;
aluminum diethyl phosphinate from about 20 wt % to about 22 wt %; and
a gas release agent from about 3 wt % to about 4 wt %, the gas release agent including a member selected from the group consisting of: dicyanoguanidine, phthalocyanine pigment, diazo compound, and combinations thereof;
wherein the pressure-sensitive adhesive is non-hygroscopic and does not absorb moisture from air at greater than 1000 parts per million, provides flame retardance to meet UL94 VTM-0, V-0, and the FAA 60 second vertical burn test and tests for heat and smoke release, and passes ball impact testing according to IEC 61965.

18. A method of making a pressure-sensitive tape, comprising:
coating one side of a substrate with a pressure-sensitive adhesive, the pressure-sensitive adhesive including: an acrylic adhesive or a rubber adhesive; aluminum diethyl phosphinate from about 14 wt % to about 29 wt %; and a gas release agent from about 1 wt % to about 10 wt %, the gas release agent including a member selected from the group consisting of: dicyanoguanidine, phthalocyanine pigment, diazo compound, melamine cyanurate, and combinations thereof, wherein the pressure-sensitive adhesive is non-hygroscopic and does not absorb moisture from air at greater than 1000 parts per million.

19. The method of claim 18, further comprising coating another side of the substrate with the pressure-sensitive adhesive.

20. The method of claim 18, wherein the gas release agent is from about 2 wt % to about 5 wt % and the pressure-sensitive adhesive provides flame retardance to meet UL94 VTM-0, V-0, and the FAA 60 second vertical burn test and tests for heat and smoke release.

* * * * *